United States Patent [19]
Jones et al.

[11] Patent Number: 4,784,422
[45] Date of Patent: Nov. 15, 1988

[54] GRIPPER AND WRIST JOINT FOR A ROBOTIC ARM

[75] Inventors: Timothy J. Jones, London; Brian R. Duke, Enfield, both of England

[73] Assignee: Universal Machine Intelligence Ltd., London, England

[21] Appl. No.: 943,269

[22] PCT Filed: Mar. 6, 1986

[86] PCT No.: PCT/GB86/00123
§ 371 Date: Jan. 6, 1987
§ 102(e) Date: Jan. 6, 1987

[87] PCT Pub. No.: WO86/05137
PCT Pub. Date: Sep. 12, 1986

[30] Foreign Application Priority Data
Mar. 6, 1985 [GB] United Kingdom ............. 8505746

[51] Int. Cl.⁴ .............................................. B66C 1/00
[52] U.S. Cl. ................................ 294/106; 414/735; 414/751; 414/744 A
[58] Field of Search ............... 294/106, 86.4, 88, 115, 294/93, 94, 103.1, 119.1, 902; 901/31, 32, 36; 414/618, 621, 729, 738, 736, 735, 744 A, 751

[56] References Cited
U.S. PATENT DOCUMENTS
3,261,479 7/1966 Baker et al.
3,572,807 3/1971 Haaker et al. ............ 294/106
3,984,009 10/1976 Holroyd.
4,368,913 1/1983 Brockmann et al.
4,484,775 11/1984 Norkus.
4,557,661 10/1985 Fischer et al.

FOREIGN PATENT DOCUMENTS
0089129 2/1983 European Pat. Off.
00101569 7/1983 European Pat. Off.
0135777 8/1984 European Pat. Off.
0157980 9/1984 European Pat. Off.
2742225 3/1979 Fed. Rep. of Germany.
3112043 2/1982 Fed. Rep. of Germany.
2090902 7/1982 United Kingdom.
2157649 4/1984 United Kingdom.

Primary Examiner—James B. Marbert
Attorney, Agent, or Firm—Ralph M. Burton

[57] ABSTRACT

A gripper and wrist joint assembly for a robotic arm. The gripper comprises a pair of identical jams connected by a pivot and including V-sections for holding large objects and end-mounted pivotal tips for holding small and flat sided objects. The jaws are opened and closed by rotation of a screw-threaded rod having screw threaded connections with the jaws, the axis of the rod being fixed and the pivot pins being guided with linear displacement during adjustment of jaws so that they are maintained central within the gripper housing. The wrist includes a pair of spiroid level gears driven by respective spiroid pinions and each meshing with an output bevel gear carried on a shaft equipped with an adjustment nut for engaging the bevel gears into firm engagement and enabling backlash to be eliminated.

16 Claims, 7 Drawing Sheets

GRIPPER AND WRIST JOINT FOR A ROBOTIC ARM

This invention relates to a gripper for a robotic arm and to a wrist joint for a robotic arm. The aims of the invention are to provide a gripper and a wrist joint which facilitate accurate control by microprocessor.

In accordance with a first aspect of the present invention there is provided a gripper for a robotic arm, characterised in that it comprises a pair of gripper jaws, a pivot connecting the jaws for pivotal movement relative to each other about a pivot axis, each jaw having a V-like gripping section, and a gripper tip mounted on the free end of the jaw for limited angular movement about an axis parallel to said pivot axis, the jaws being substantially symmetrical with respect to a predetermined plane containing said pivot axis, and adjusting means coupled to the jaws for pivoting the jaws about the pivot axis while maintaining the jaws symmetrical relative to said predetermined plane.

In a preferred embodiment of the invention the gripper includes a housing, and guide means provided on the housing guides the pivot for linear displacement during adjustment of the gripper jaws. In particular, the pivot includes a pivot pin and the guide means comprises a slot in which an end of the pivot pin is slidably engaged. The adjusting means conveniently comprises a threaded rod journalled in the housing for rotation about a fixed axis perpendicular to the plane of symmetry, each jaw being coupled to the rod through a screw-threaded connection. These preferred features enable simple and accurate control of the gripper, the jaws being always positioned symmetrically with respect to the centre line of the gripper.

In the preferred construction the gripper is also adapted for handling objects of widely varying shapes and sizes. The V-like sections of the jaws themselves can be used for holding larger objects. Each gripper tip is preferably formed to define a substantially flat gripping face, for cooperating with plane-sided objects. In addition, a notch can be provided in the grippping face, the notch being parallel to the axis about which the tip is pivotable and spaced forwardly therefrom in the direction away from the pivot axis of the jaws. Such notches in the tips facilitate the gripping of, for example, small cylindrical objects. Notches at 90° to the pivot axis may be provided also. The angular displacement of each gripper tip is conveniently limited in both directions by abutment of the tip with stop surfaces provided on the jaw carrying the tip, and the grasping of objects is facilitated if the tips are each biased by spring means, such a torsion spring, into a limit position against one of the stop faces.

In accordance with a second aspect provides a wrist joint for a robotic arm, comprising first and second bevel gears journalled in a housing for rotation about a given axis, respective drive mechanisms for rotating the first and second bevel gears, and an output bevel gear meshing with the first and second bevel gears and carried on a shaft having an axis perpendicular to said given axis, characterised in that the first and second bevel gears are combined gears, the drive mechanism for each of the first and second gears comprises a driving pinion meshing therewith, and an adjustment means is coupled to the shaft and is adjustable relative to the shaft to urge the output gear into firm meshing engagement with the first and second gears and thereby to urge the first and second gears into firm meshing engagement with the driving pinions.

The adjustment means facilitates assembly of the wrist joint be enabling backlash to be conveniently eliminated, which in turn permits accurate control of the wrist joint.

In a preferred construction the adjustment means comprises a nut having screw threaded connection on the shaft. The nut can be arranged to cooperate with abutment means on a bearing housing accommodating a bearing for the shaft.

A gripper and wrist joint assembly embodying the invention will now be described in more detail, with reference being made to the accompanying drawings in which.

Figure 1:
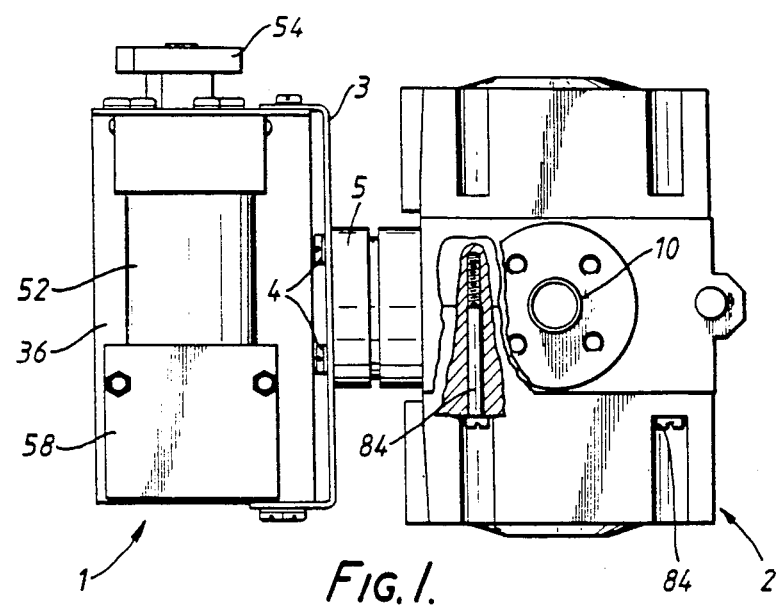
FIG. 1 is a top plan view of the assembly, but with the gripper jaws not shown.
Figure 3:
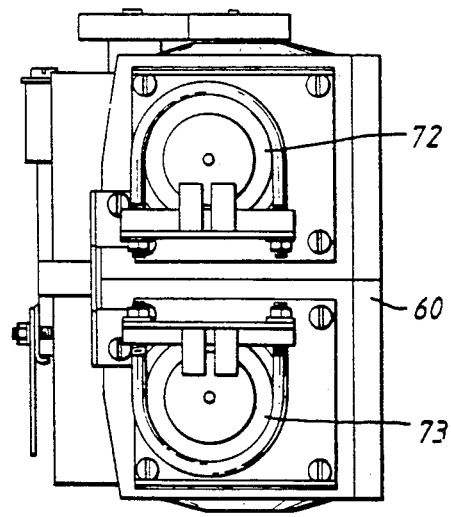
FIG. 3 is a rear end view of the assembly.

The grippr and wrist joint assembly shown in FIGS. 1 to 4 may be mounted at the end of a robotic arm, a spigot 10 being shown attached to the wrist housing for this purpose. The gripper and wrist joint are separate sub-assemblies and each could be used without the other. As shown the gripper 1 is attached to wrist joint 2 by a bracket 3 and screws 4, a spacer 5 being shown interposed between the bracket and the output member of the wrist joint.

Figure 2:
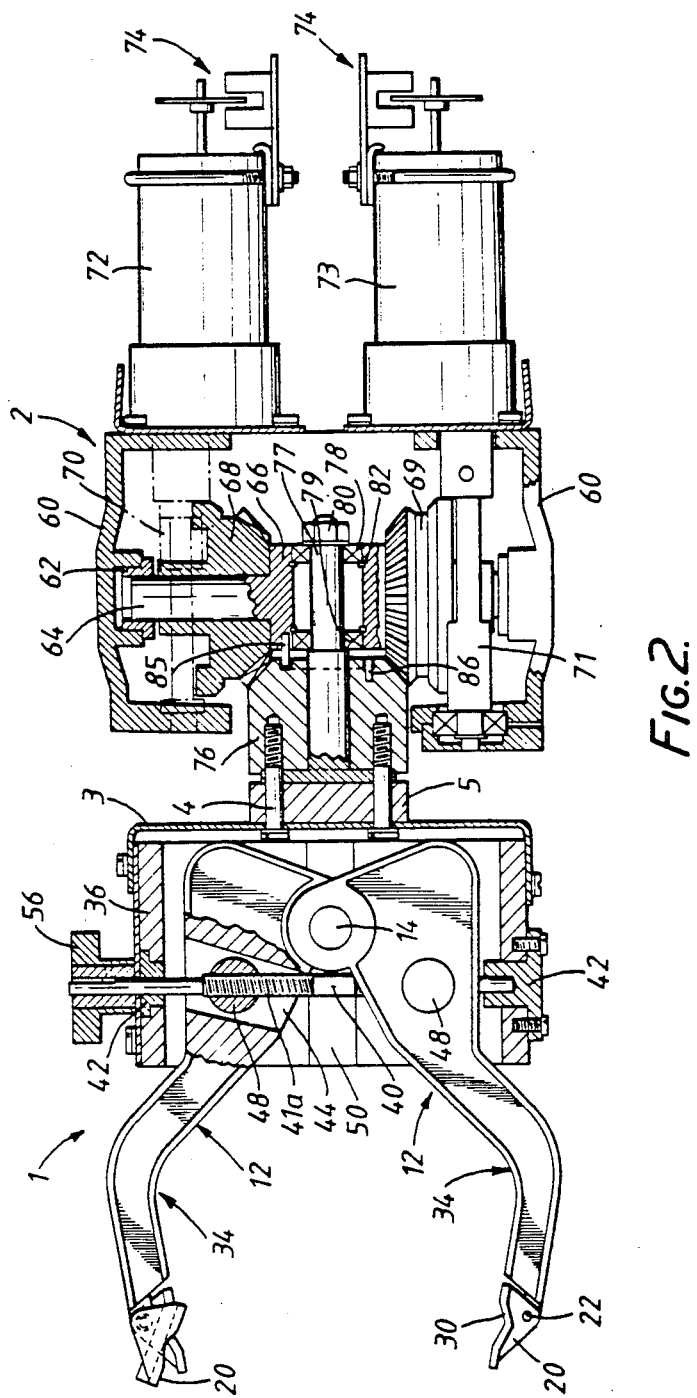
FIG. 2 is a section through the assembly.
Figure 4:
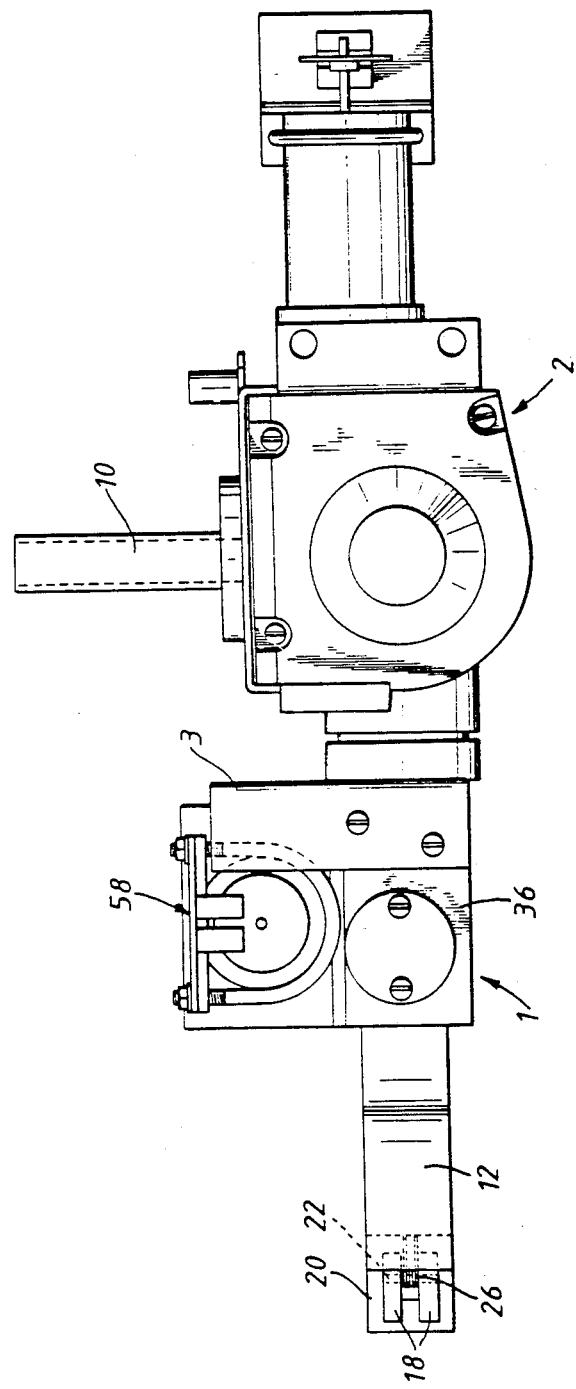
FIG. 4 is a side view of the assembly.
Figure 5:
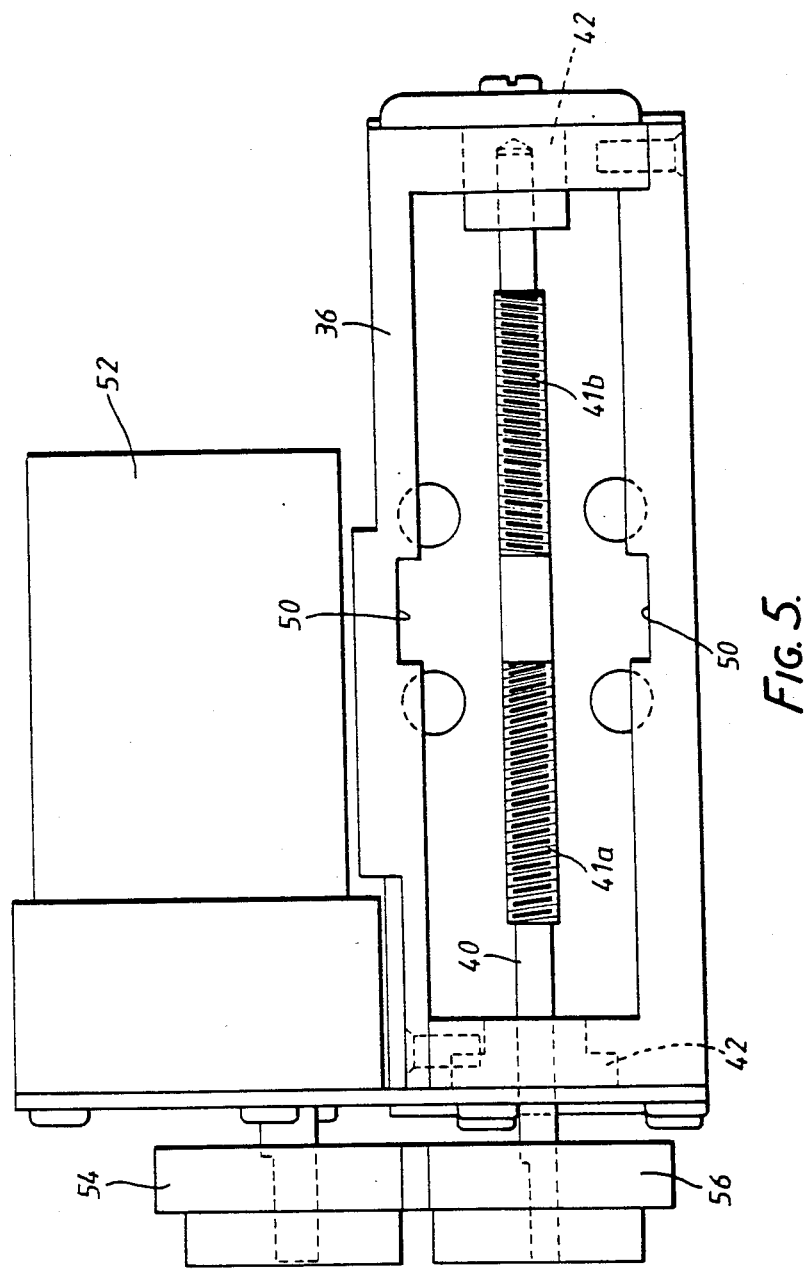
FIG. 5 is a front elevation of the gripper with the jaws removed.
Figure 6:
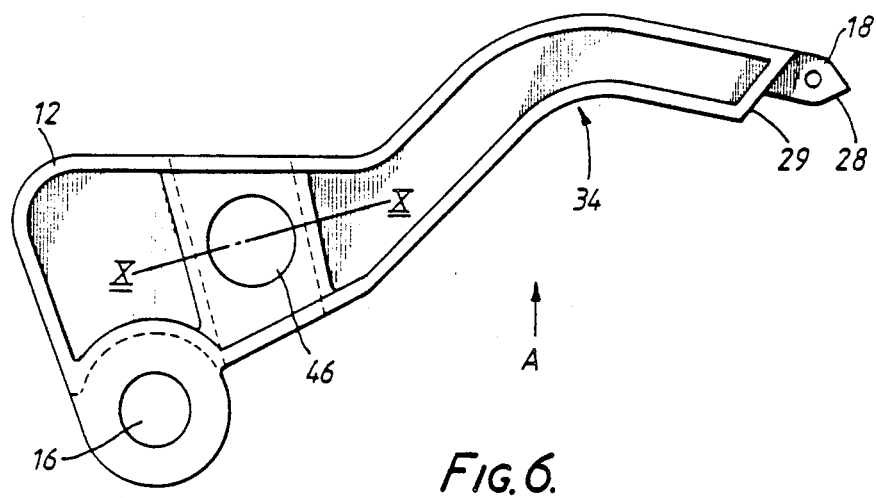
FIG. 6 is a top view of a gripper jaw.
Figure 7:
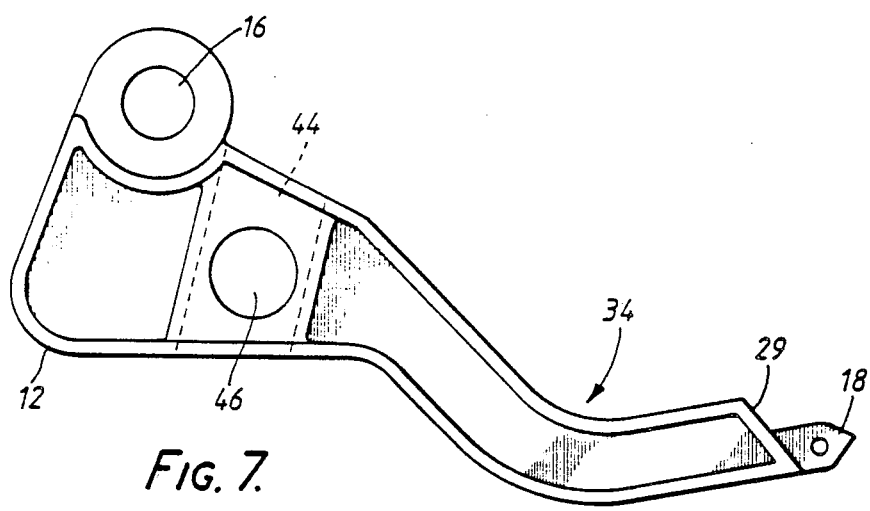
FIG. 7 is an underneath view of the gripper jaw.
Figure 10:
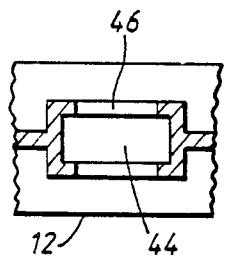
FIG. 10 is a section along the line X—X in FIG. 6.
Figure 8:
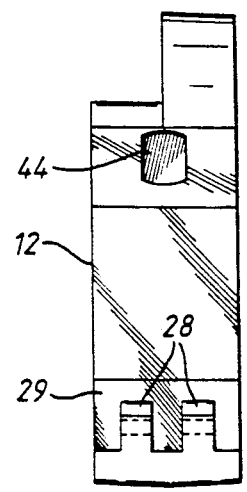
FIG. 8 is a front end view of the gripper jaw.
Figure 9:
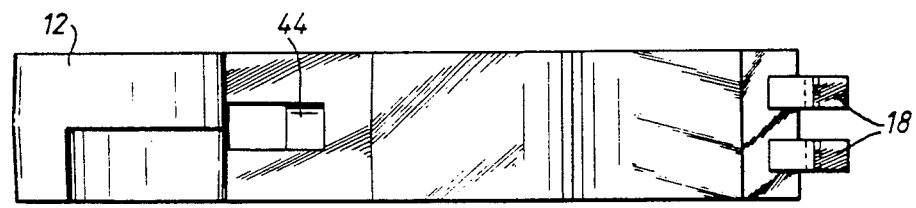
FIG. 9 is a side view of the gripper jaw as seen in the direction of arrow A in FIG. 6.
Figure 11:
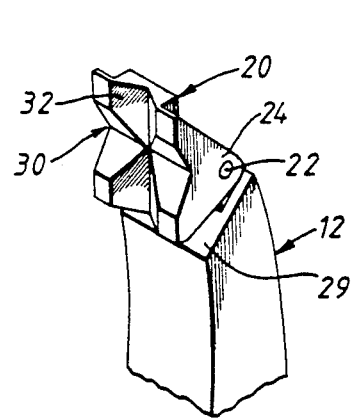
FIG. 11 is a front perspective view showing a gripper tip mounted on a gripper jaw.
Figure 12:
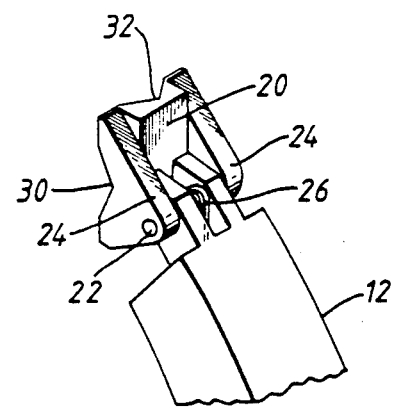
FIG. 12 is a rear perspective view of the gripper tip.

The gripper has a pair of identical moulded jaws 12, each being as shown in FIGS. 6–10. The jaws are pivoted together by a pin 14 which extends through aligned holes 16 formed in the jaws at their rear or inner ends. Each jaw has a forked forward end defining projections 18 on which a gripping tip 20 is mounted for limited angular movement about the axis of a pivot pin 22 which extends through a pair of ears 24 provided on the back of the tip and through the projections 18 which are received between the ears (see FIGS. 11 and 12). A coil torsion 26 spring is located on the pin 22 and urges the tip with a light spring force to a limit position defined by abutment faces 28 on the projections 18. Movement of the tip in the opposite direction is limited by abutment with the shoulder 29 on the jaw at the root of the projections 18. The two extreme positions are shown in FIG. 2 for the tip of the upper jaw in that figure. The tip 20 has a planar gripping face with perpendicular V-notches 30, 32 extending across it parallel and perpendicular to the pivot pin 22 respectively.

Figure 13A:
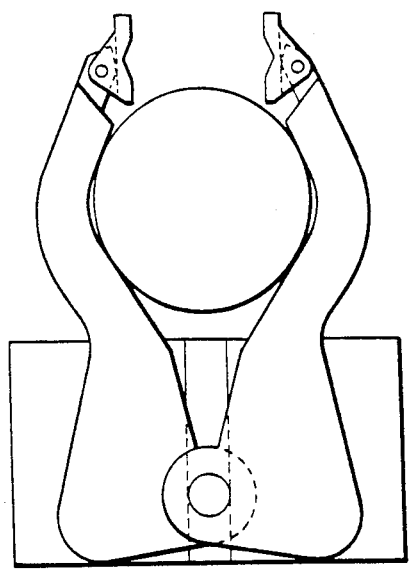
FIGS. 13a to 13e illustrate the gripper holding objects of different shapes and sizes.
Figure 13B:
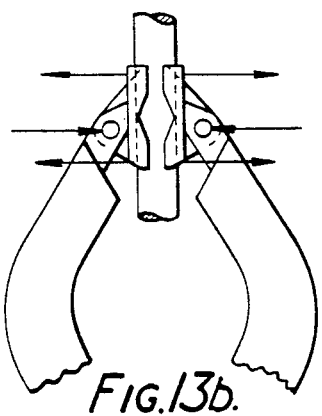
Figure 13C:
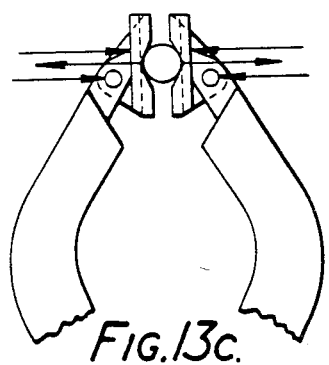
Figure 13D:
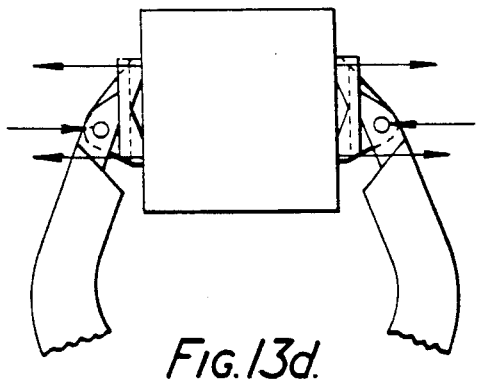
Figure 13E:
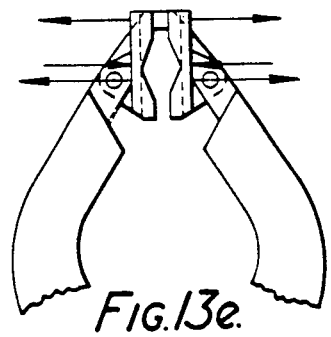

Adjacent its forward end the jaw 12 includes a V-like section 34, the vertex of the V having an obtuse angle and being rounded. These V-sections of the two jaws can be used to grasp and hold relatively large objects, such as a cylindrical article as shown in FIG. 13a. The tips 20 enable objects of other shapes and sizes to be held. Thus, the notches 32 of the tips allow small cylinders to be held in the plane of the gripper as shown in FIG. 13b, and the notches 30 enable a small cylindrical object to be held normal to the plane of the gripper as shown in FIG. 13c. It should be noted that the notches 30 are displaced forwardly with respect to the pivot pins 22 so that, when used to grasp an object as in FIG. 13c, the reaction forces maintain the tips 20 in firm engagement against the abutment faces 28 on the jaw projections. The planar gripping faces of the tips 20 are used for holding both large and small flat sided objects, e.g. as shown in FIGS. 13d and 13e. When the tips 20 are closed against a generally parallel-sided object, as in FIGS. 13b and 13d, the rear ends of the tips contact the object first and as the jaws continue to close the tips are pivoted against the bias of the springs 26 until the front ends of the tips engage the object also. From the foregoing it will be understood that the gripper of the invention is able to hold securely objects of widely differing shapes and dimensions by simple pivotal actuation of the gripper jaws.

The rear ends of the gripper jaws are received in a housing 36 and adjusting means are provided for pivoting the jaws relative to each other about the axis of the pivot pin 14. The adjusting means includes a screw threaded rod 40 journalled in the housing by bushes 42 for rotation about a fixed axis. The jaws have transverse through openings 44 of rectangular cross-section, and circular apertures 46 which intersect with the openings and receive cylindrical bushes 48, the rod 40 passing through the openings 44 and through internally threaded holes in the bushes 48. The bushes 48 and the respective threaded sections 41a, 41b of rod 40 cooperating therewith are oppositely threaded, whereby rotation of the rod in one direction causes the jaws 12 to be closed together and rotation of the rod in the opposite direction causes them to be opened apart. The ends of the pivot pin 14 projects from the jaws 12 and engages slidably in slots 50 provided on the inside of the top and bottom walls of the housing. The slots guide the pivot pin 14 for linear displacement during adjustment of jaws thereby ensuring that the jaws remain central in the gripper housing and are always symmetrical with respect to a plane containing the pivot axis. As a result both initial assembly of the gripper and accurate positional control of the gripper of the end of a manipulator arm are facilitated.

An electric motor 52 is mounted on the gripper housing and is operable to rotate the adjusting rod 40 through gears 54, 56. In FIGS. 1 to 4 an encoder device 58 is shown connected to the motor 52 to enable the speed and position of the gripper jaws to be controlled by a microprocessor.

The wrist joint 2 has a two-part housing 60 including opposed bosses which receive sleeve bearings 62 for the free ends of shafts 64 extending in opposite directions from a central bearing housing 66. Rotatable on the respective shafts 64 are first and second combined spiroid and bevel gears 68, 69 which mesh with respective spiroid driving pinions 70, 71 journalled for rotation in the respective housing parts and connected to respective driving motors 72, 73 which are equipped with encoder devices 74 for microprocessor control. The combined spirod and bevel gears mesh with an output bevel gear 76 carried on a shaft 77 journalled in the housing 66 by bearings 78, 79. The end of the shaft 77 projecting through the housing 66 is threaded and carries a nut 80 which presses the bearing 78 against an abutment defined on the housing 66 by a circlip 82.

During assembly of the wrist joint the nut 80 is tightened to draw the shaft 77 and hence the output bevel gear 76 into firm mesh with the spirod bevel gears 68,69. The side thrust thus generated on the spiroid bevel gears forces them into hard mesh with the spiroid pinions and since the cross shaft 64 can float axially in bearings 62 an equal meshing force between both sets of spiroid pinions is maintained. Backlash can thus be controlled on all four meshing surfaces by a single adjustment of nut 80. Shims may be introduced between the housing halves which are secured by screws 84 (FIG. 1) to ensure ideal meshing between the bevel gears on assembly.

The thrust of the output bevel 76 is transmitted to the housing through the bearing 78, circlip 82, bearing housing 66 and shafts 64.

In use of the wrist joint, operating the drive motors 72, 73 at the same speed and in the same direction results in the gripper 1 pitching without rolling, i.e. the output bevel gear 76 is turned around the axis of the shafts 64 without being rotated about its own axis. Operation of the motors at the same speed but in opposite directions results in rolling motion only, the output gear 76 only rotating about the axis of its shaft 77. Any other combination of motor speeds and directions produce a combined pitch and roll movement of the gripper 1.

It will be seen that a stop pin 85 fitted to the end of bearing housing 66 projects into a slot in the rear face of gear 76 and engages a stop pin 86 positioned in the slot to limit the rolling movement. Pitching movement is limited by the output gear 76 engaging the housing 60 at the end of its travel about the axis of shafts 64.

The mounting spigot 10 can define a jaw axis for the gripper and wrist assembly, the axis of this spigort being coincident with axes of pitch and roll motions whereby control is facilitated.

From FIG. 2 of the drawings it can be seen that the spiroid pinions 70, 71 mesh with the respective spirod gears 68, 69 at opposite sides. This enables the use of identical spiroid gears 68, 69 which is an advantage.

We claim:

1. A gripper for a robotic arm comprising, in combination:
    a housing;
    a pair of gripper jaws;
    a pivot located in the housing and connecting the jaws for pivotal movement relative to each other about a pivot axis;
    said jaws being substantially symmetrical with respect to a predetermined plane containing the pivot axis;
    an adjusting rod journalled in the housing for rotation and coupled to each jaw for pivoting the jaws about the pivot axis to open and close the jaws in response to rotation of the rod in opposite directions; and
    guide means on the housing for guiding said pivot for rectilinear displacement during opening and closing movements of the gripper jaws thereby maintaining the jaws in symmetrical relation relative to said predetermined plane.

2. A gripper according to claim 1 wherein each jaw has a V-like gripping section.

3. A gripper according to claim 2 wherein the V-like gripping sections of the jaws are substantially identical to each other.

4. A gripper according to claim 1, wherein the pivot comprises a pivot pin projecting from the jaws, and the guide means comprises a slot, said pivot pin engaging slidably in the slot.

5. A gripper according to claim 1, wherein the rod is coupled to each jaw by a screw-threaded connection.

6. A gripper according to claim 5, wherein a motor is mounted on the housing and is operable to rotate the adjusting rod.

7. A gripper according to claim 1 wherein a gripper tip is mounted on the free end of each jaw for angular movement about an axis parallel to the pivot axis, and each jaw is provided with abutments engageable by the tip mounted thereon to limit the angular movement of the tip.

8. A gripper according to claim 7, wherein the tip is biased into a limit position against an abutment on the jaw by spring means.

9. A gripper according to claim 7, wherein each gripper tip defines a substantially planar gripping face.

10. A gripper according to claim 9, wherein the gripping face includes a notch parallel to the axis about which the tip is movable relative to the jaw, the notch being spaced forwardly from said axis.

11. A gripper according to claim 9, wherein gripping face includes a notch extending in a direction at 90° to the axis about which the tip is movable relative to the jaw.

12. In wrist joint for a robotic arm, having a housing first and second bevel gears journalled in the housing for rotation about a given axis, respective drive mechanisms for rotating the first and second bevel gears, and an output bevel gear meshing with the first and second bevel gears and carried on a shaft having an axis perpendicular to said given axis, the improvement wherein the first and second bevel gears are combined gears the drive mechanism for each of the first and second gears comprises a driving pinion meshing therewith, and an adjustment means is coupled to the shaft and is adjustable relative to the shaft to urge the output gear into firm meshing engagement with the first and second gears and thereby to urge the first and second gears into firm meshing engagement with the driving pinons.

13. A wrist joint according to claim 12, wherein an end of the shaft (77) is screw-threaded and the adjustment means comprises a nut (80) screwed onto the shaft.

14. A wrist joint according to claim 13, wherein the shaft (77) is journalled for rotation in a bearing housing (66), the end of the shaft projecting through the bearing housing carrying the adjustment nut, and the bearing housing being provided with an abutment (82) against which the thrust forces of the output gear (76) are transmitted by the adjustment nut (80).

15. A wrist joint according to claim 12, 13 or 14, wherein the first and second gears are combined spiroid and bevel gears (68, 69), and the drawing pinions are spiroid pinions (70, 71).

16. A wrist joint according to claim 15 wherein the first and second combined spiroid and bevel gears are substantially identical to each other.

* * * * *